United States Patent
Führing et al.

[11] Patent Number: 6,108,615
[45] Date of Patent: Aug. 22, 2000

[54] METHOD FOR ANALYZING PROCESS SIGNALS OF A TECHNICAL PLANT, IN PARTICULAR A POWER PLANT

[75] Inventors: Thorsten Führing, München; Hans-Gerd Mederer, Erlangen; Jiri Panyr, München; Alexander Politiadis-Behrens, Höchstadt a.d. Aisch; Ulrich Preiser, München, all of Germany

[73] Assignee: Siemens Aktiengesellschaft, Munechen, Germany

[21] Appl. No.: 09/020,604

[22] Filed: Feb. 9, 1998

Related U.S. Application Data

[63] Continuation of application No. PCT/DE96/01461, Aug. 5, 1996.

[30] Foreign Application Priority Data

Aug. 9, 1995 [DE] Germany .................. 195 29 301

[51] Int. Cl.[7] ............................................... G06F 15/48
[52] U.S. Cl. ................................... 702/183; 702/182
[58] Field of Search ............................ 702/188, 182, 702/183, 184, 185; 345/440

[56] References Cited

U.S. PATENT DOCUMENTS

| 5,315,502 | 5/1994 | Koyama et al. | 364/184 |
|---|---|---|---|
| 5,394,447 | 2/1995 | Scarola et al. | 376/259 |
| 5,442,555 | 8/1995 | Reifman et al. | 364/431.01 |

FOREIGN PATENT DOCUMENTS

| 95/14912 | 6/1995 | WIPO . |
|---|---|---|
| 95/18420 | 7/1995 | WIPO . |

OTHER PUBLICATIONS

"The Automated Screen Layout" (Lüders et al.), Informatik Forschung und Entwicklung, vol. 10, 1995, pp. 1–13.
Patent Abstracts of Japan No. 5 256 741 (Shigeru), dated Oct. 5, 1993.

*Primary Examiner*—Timothy P. Callahan
*Assistant Examiner*—Linh Nguyen
*Attorney, Agent, or Firm*—Herbert L. Lerner; Laurence A. Greenberg; Werner H. Stemer

[57] ABSTRACT

A method for analyzing process signals of a technical plant, in particular a power station plant, having a system process subdivided into functional units, includes performing simplified signal tracing for a diagnosis or a forecast of a system state by checking if a process signal is a component of a functional unit, for each process signal and each functional unit. Thereafter, a degree of correlation between each two process signals is determined with the aid of the number of those functional units in which they are jointly a component. Subsequently, the process signals correlated with a prescribed process signal are represented as information elements that are positioned relative to one another in such a way that the distance between each two information elements represents the degree of their correlation.

7 Claims, 2 Drawing Sheets

METHOD FOR ANALYZING PROCESS SIGNALS OF A TECHNICAL PLANT, IN PARTICULAR A POWER PLANT

CROSS-REFERENCE TO RELATED APPLICATION

This application is a continuation of International Application Serial No. PCT/DE96/01461, filed Aug. 5, 1996, which designated the United States.

BACKGROUND OF THE INVENTION

Field of the Invention

The invention relates to a method for analyzing process signals of a technical plant, in particular a power plant, having a plant process which is subdivided into functional units.

In a control center for controlling a power plant, great quantities of various measurement data which in their entirety describe the status of the plant or operation, appear constantly. The power plant operating staff has the task of identifying the particular measurement data or measurement variables that are relevant to the operating state and the task of following, analyzing and interpreting the values thereof with reference to the status of the plant. Typically, the operating staff is supported by information filters provided in the power plant control system, and those filters cause archived measurement data or variables, or those relevant solely to the current plant status, to be displayed on a screen or a gauge. The predominant amount of the total measurement data or variables ascertained is typically logged-in electronically.

A primary goal in analysis or interpretation of resultant measurement data logs, in particular in system diagnosis, is to find a cause of a report that has been generated. Particularly in troubleshooting, the operating staff must find out what error led to the appearance of a trouble signal. That requires tracing signals back, in which a chain of linked-together report events is traced back to their source from the trouble report which is received.

German Published, Non-Prosecuted Patent Application DE 44 36 658 A1, corresponding to U.S. Pat. No. 5,548,597, discloses an apparatus and a method for troubleshooting, in which correlations are made between output signals of sensors for diagnostic purposes.

In order to simplify that kind of backtracking of signals, the plant process in a power plant is typically broken down into functional units. Each of those functional units includes a small number of method steps which are logically linked to one another, analogously to a subprogram of a computer program. Each functional unit may be assigned a function plan, which represents the data flow in a functional unit, on the order of a flow chart. In order to backtrack signals, for instance in the event of an accident or a malfunction, the operating staff uses the function plans and finds the particular report chain that led to a trouble report. However, that involves major effort as well as major demands of the operating staff, who are under enormous time pressure, since fast decisions to initiate countermeasures must often be made.

SUMMARY OF THE INVENTION

It is accordingly an object of the invention to provide a method for analyzing process signals of a technical plant, in particular a power plant, which overcomes the hereinafore-mentioned disadvantages of the heretofore-known methods of this general type and which permits reliable, precise report analysis. This should be accomplished so fast that suitable counter provisions can be undertaken in good time if needed so that long down times of the power plant and/or propagations of errors are avoided.

With the foregoing and other objects in view there is provided, in accordance with the invention, a method for analyzing process signals of a technical plant, especially a power plant, performing a plant process subdivided into functional units, which comprises checking if a process signal is a component of a functional unit, for each process signal and each functional unit; determining a degree of correlation of each two process signals from the number of the functional units in which they are jointly a component; and displaying the process signals correlated with a predetermined process signal as information elements positioned relative to one another for representing the degree of their correlation by a spacing between each two information elements, and positioning the information elements representing the most highly correlated process signals at the least spacing from one another.

The invention proceeds in this case from the consideration that it is possible on the basis of the mathematical model of formal concept analysis to filter, compress and/or structure large quantities of process signals with regard to their significance for the operating state of the power station plant in accordance with the principle of "contextual proximity corresponds to spatial proximity".

In this case, the process signals are interpreted in the sense of formal concept analysis as objects to which the functional units are assigned as characteristics according to the criterion of whether or not a process signal is a component of a functional unit. A process signal is regarded in this case as a component of a functional unit when it is processed in this functional unit by, for example, logic operators being applied to this process signal. This also includes, in particular, the process signal being fed to the functional unit as an input variable, the process signal being generated by the functional unit and thus being provided as an output variable, or the process signal being passed unchanged through the functional unit.

After performing a check in the manner of a truth table for all process signals, in order to determine which functional units they are a component of and which they are not a component of, the contextual or else content-related proximity of each two process signals is determined. For this purpose, the ratio of the number of the functional units in which the two process signals are jointly a component to the number of those functional units in which at least one of the two process signals is a component, is determined. In other words: in each case two process signals, which correspond in all characteristics because they are a component of the same functional units, are classified as being particularly close to one another in content, whereas two process signals which do not correspond in any characteristic because they are not jointly a component of any functional unit, are classified as not being close to one another in content.

For the purpose of graphical representation, for a prescribed process signal, the proximity of this process signal in terms of content to other process signals is transformed into a spatial proximity of the information element representing the process signals. The prescribed process signal can be a fault signal in this case, for example. The graphical representation can thus be used to represent other process signals, which are particularly strongly correlated with the selected process signal, in a manner positioned close to the latter, with the result that it is particularly easy for the operating staff to detect which measured data or measured variables have been generated in connection with the fault signal. It is possible in this way to perform signal tracing, and thus fault diagnosis, in a particularly reliable and effective manner.

In accordance with another mode of the invention, a process signal detected on-line is provided for diagnosing the system state. For the purpose of tracing, it is also possible to prescribe an archived process signal detected on-line. The thus possible rapid determination of the process signals correlated with this process signal detected on-line makes it possible to identify the cause of a fault signal particularly effectively.

In accordance with a further mode of the invention, a simulated process signal is prescribed for a forecast of a system state. It is therefore possible to trace the further process signals generated in the manner of a logic concatenation by a process signal. It is thereby possible to estimate, plan or foresee the behavior of the power station plant particularly effectively.

In accordance with an added mode of the invention, the temporal and/or the logic sequence of process signals is represented in order to support the signal tracing particularly effectively. In this case, a differentiation is made in the representation, as to whether a first process signal precedes or succeeds a second process signal temporally and/or logically. In this way it is particularly easy to interpret a development of the system state. The sequence of process signals can be represented in this case by an arrow between information elements each assigned to two process signals, with the arrow head pointing in the direction of the information element representing the temporally or logically later process signal.

The graphic representation which is generated can be merely a configuration of information elements representing process signals. Preferably, however, in accordance with an additional mode of the invention, the information elements are represented both by process signals and by functional units with the aid of their correlations with one another.

In addition, in accordance with a concomitant mode of the invention, the process signals of operators that are combined with one another are represented as information elements.

The information space in which the information elements are represented is n-dimensional, and preferably three-dimensional. Consequently, three space coordinates are preferably used to fix the position of each information element in this information space. A representation is therefore advantageously selected on a suitable display device in the control room, for example on a screen.

Other features which are considered as characteristic for the invention are set forth in the appended claims.

Although the invention is illustrated and described herein as embodied in a method for analyzing process signals of a technical plant, in particular process signals of a power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
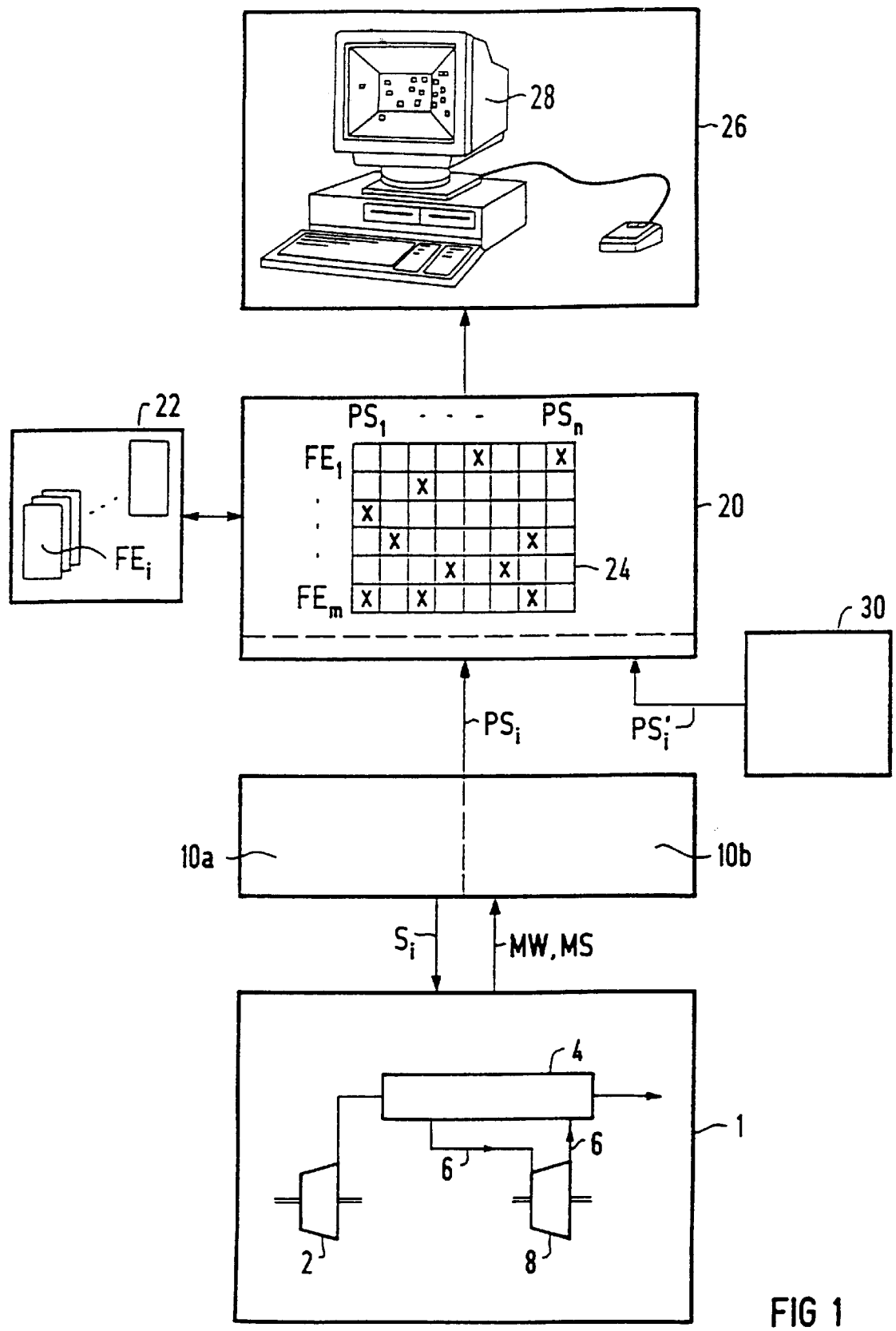
FIG. 1 is a function chart with components provided for carrying out a method for analysis of a power station plant.

Referring now to the figures of the drawings in detail and first, particularly, to FIG. 1 thereof, there is seen a diagrammatically represented power station plant or system which is a gas and steam turbine system 1. The turbine system 1 includes a gas turbine 2 and a waste heat steam generator 4 which is connected downstream of the gas turbine 2 on the gas side and has heating surfaces that are connected into a water/steam circuit 6 of a steam turbine 8.

Measured values MW detected by non-illustrated sensors and alarm signals MS output by non-illustrated signaling elements, are fed to an automation system 10a and an information system 10b of instrumentation and control equipment.

The measured values MW and the alarm signals MS are preprocessed in automation units of the automation and information systems 10a, 10b of the gas and steam turbine system 1. If appropriate, control signals $S_i$ are output to components of the gas and steam turbine system 1. The information which comes together relating to measurement, regulation and control events and relating to signal generation is stored in the information system 10b. The gas and steam turbine system 1 is automatically controlled and monitored by processes proceeding inside the automation and information systems 10a, 10b. With the aid of the values MW that are measured on line, the alarm signals MS and the control signals $S_i$, the automation and information systems 10a, 10b generate process signals $PS_i$ that are relevant to the system process. The process signals are passed to a computer chip 20 connected to the automation and information systems 10a, 10b.

The system process of the gas and steam turbine system 1 is subdivided into functional units $FE_i$ in terms of its structure. Each functional unit $FE_i$ is stored in the manner of a flow chart as a function diagram in a memory chip 22 connected to the computer chip 20.

In this layout, each functional unit $FE_i$ includes a number of technical method steps required to carry out an operation, in the manner of a subroutine of a computer program. Thus, for example, the functional unit "emergency pump shut down" includes the method steps of "shut down pump energy supply" "shut off pump feed and discharge lines" and "activate standby pump". The functional unit $FE_i$ is fed a number of process signals $PS_i$ for this purpose. These process signals $PS_i$ are processed in the functional unit $FE_i$ and thereby modified or converted into other process signals $PS_j$. Process signals $PS_j$ which are generated in the functional unit $FE_i$ are output by the functional unit $FE_i$ as output variables. Each process signal $PS_i$ is thus a component of a number of functional units $FE_i$. In other words: each process signal $PS_i$ is an input variable for, or an output variable of, a number of functional units $FE_i$. However, a process signal $PS_i$ can also be relayed unchanged by the functional unit $FE_i$.

Upon being retrieved, the functional units $FE_i$ are fed to the computer chip 20. A check is performed within the computer chip 20 for each process signal $PS_i$ and for each functional unit $FE_i$ as to whether or not this process signal $PS_i$ is a component of this functional unit $FE_i$. For this purpose, a context is generated in which a unique assignment of functional units $FE_i$ to process signals $PS_i$ is carried out in the form of a matrix 24. This assignment is to be understood in the sense of a formal concept analysis as an allocation of characteristics to objects.

After a specific process signal $PS_i$ has been stipulated, information present in the context is used to assign space coordinates to all of the process signals $PS_i$ of the computer chip 20. In this case, the degree of correlation between two process signals $PS_i$ in each case is determined in accordance with the principle of "contextual proximity corresponds to spatial proximity". For this purpose, a ratio of the number of those functional units $FE_i$ in which the two process signals $PS_i$ are jointly a component, to the number of the functional units $FE_i$ in which at least one of the two process signals $PS_i$ is a component, is determined. This ratio then yields a quantitative measure for the degree of correlation between these two process signals $PS_i$. If, for example, the two process signals $PS_i$ are exclusively a component of the same functional units $FE_i$, there is a high degree of correlation between the two process signals $PS_i$. In contrast, two process signals $PS_i$ are not mutually correlated if they are not a joint component in any functional unit $FE_i$. This quantitative measure of the correlation between two process signals $PS_i$ is transformed into a corresponding spacing of their spatial coordinates relative to one another.

A graphical representation is generated for the process signals $PS_i$ in a graphics module 26 on the basis of this spatial assignment. The graphics module 26 firstly generates information elements $I_i(PS_i)$ for the process signals $PS_i$ that are correlated with the prescribed process signal $PS_i$, and the elements are then positioned on a display 28 with the aid of the spatial coordinates. In this case, the operating staff can already detect the extent to which a process signal $PS_i$ is correlated with a prescribed process signal $PS_i$ from the spacing between an information element $I_i(PS_i)$ of the process signal $PS_i$ and an information element $I_i(PS_i)$ of the prescribed process signal $PS_i$. This renders clear the importance of each process signal $PS_i$ for the prescribed process signal $PS_i$. If, for example, a fault signal is selected as a prescribed process signal $PS_i$, it is easy for the operating staff to see which are the relevant process signals $PS_i$ for this fault signal. This plainly facilitates signal tracing for the purpose of diagnosis, in particular an analysis of the causes of the fault.

As an alternative, the computer chip 20 can also be prescribed a simulated process signal $PS_i'$, which has been generated in a simulator chip 30 connected to the computer chip 20. In this case, the information elements $I_i(PS_i)$ of those process signals $PS_i$ which are correlated with the simulated prescribed process signal $PS_i'$ are represented on the display 28. It is thus possible for the operating staff to predict, in the manner of a forecast, which process signal $PS_i'$ will contribute to generating which process-signal $PS_i$.

Figure 2:
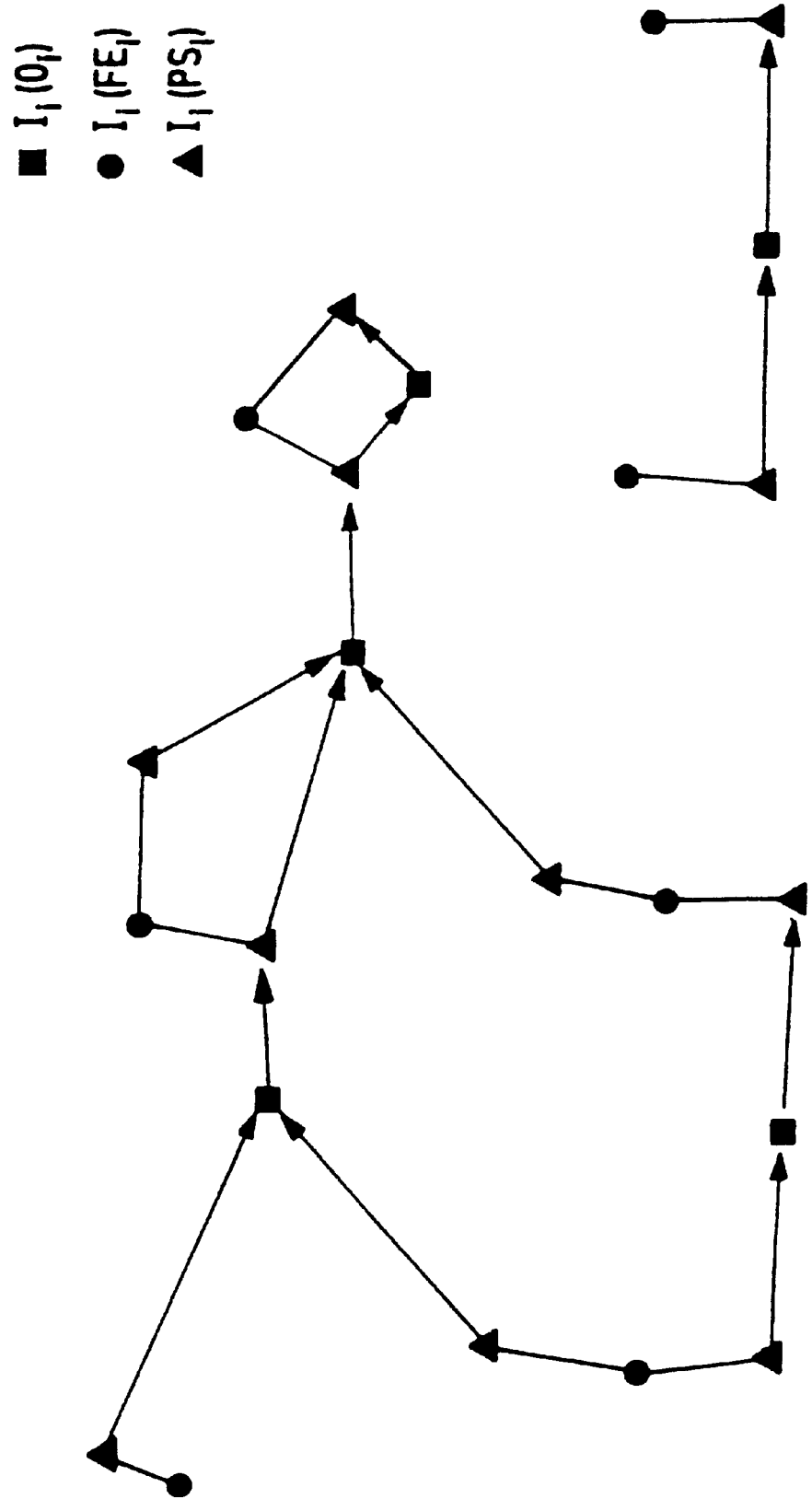
FIG. 2 is a configuration of information elements representing process signals or functional units, wherein the configuration is characteristic of an operating state of the power station plant.

The information elements $I_i(PS_i)$ assigned to the process signals $PS_i$ can also be represented jointly together with information elements $I_i(FE_i)$ and $I_i(O_i)$ respectively assigned to functional units $FE_i$ and/or process signals $PS_i$ of mutually combined operators $O_i$. FIG. 2 shows this in a graphical representation of a measured data log. A temporal and/or logic sequence of process signals $PS_i$ is represented therein for two process signals $PS_i$ in each case by an arrow between the information elements $I_i(PS_i)$ assigned to the process signals. The head of the arrow points in the direction of the information element $I_i(PS_i)$ assigned in each case to the process signal $PS_i$ which occurs later, temporally or logically. The concentration of the process signals $PS_i$ on which the alarm sequence is based is represented thereby.

We claim:

1. In a method for analyzing process signals of a technical plant performing a plant process subdivided into functional units, the improvement which comprises:

checking if a process signal is a component of a functional unit, for each process signal and each functional unit;

determining a degree of correlation of each two process signals from the number of the functional units in which they are jointly a component; and displaying the process signals correlated with a predetermined process signal as information elements positioned relative to one another for representing the degree of their correlation by a spacing between each two information elements, and positioning the information elements representing the most highly correlated process signals at the least spacing from one another.

2. The method according to claim 1, which comprises diagnosing a plant status from a process signal generated from measurement values or report signals detected on-line.

3. The method according to claim 1, which comprises forming a prognosis of a plant status from a simulated process signal.

4. The method according to claim 1, which comprises displaying at least one of a chronological and a logical sequence of process signals.

5. The method according to claim 1, which comprises displaying a number of the functional units in the form of information elements on the basis of their correlations with one another, and displaying the number of the functional units with the process signals.

6. The method according to claim 1, which comprises displaying process signals of linked-together operators in the form of information elements.

7. The method according to claim 5, which comprises displaying process signals of linked-together operators in the form of information elements.

* * * * *